United States Patent [19]

Madden et al.

[11] 4,205,774

[45] Jun. 3, 1980

[54] DEVICE FOR WELDING TUBES TO PIPE

[75] Inventors: Stephen A. Madden; Richard B. Gwin, both of Bartlesville; Steven A. Lively, Dewey, all of Okla.

[73] Assignee: H. C. Price Co., Bartlesville, Okla.

[21] Appl. No.: 942,918

[22] Filed: Sep. 18, 1978

[51] Int. Cl.² .......................... B23K 9/10; B23K 37/02
[52] U.S. Cl. .......................................... 228/32; 228/7; 228/25; 228/45; 219/125.1
[58] Field of Search ................ 228/32, 25, 7, 45; 219/125.1, 124.31, 124.32, 124.4

[56] References Cited

U.S. PATENT DOCUMENTS

| | | | |
|---|---|---|---|
| 2,258,670 | 10/1941 | Anderson | 228/32 |
| 2,448,694 | 9/1948 | Tyrner | 219/125.1 |
| 3,527,918 | 9/1970 | Fielder et al. | 228/45 |
| 3,779,444 | 12/1973 | Kensrue | 219/124.31 |
| 3,870,853 | 3/1975 | Reinhardt et al. | 219/124.31 |
| 3,937,918 | 2/1976 | Robertson | 228/45 |
| 4,056,705 | 11/1977 | Linam et al. | 219/125.1 |

*Primary Examiner*—Daniel C. Crane

*Attorney, Agent, or Firm*—Lowe, Kokjer, Kircher, Wharton & Bowman

[57] ABSTRACT

A device for automatically welding a tube onto a pipe of larger diameter is the subject of the present invention. Tack welding is achieved by two welding torches located on opposite sides of the tube and spaced apart longitudinally a distance equal to the distance desired between tack welds. The entire torch assembly is mounted on a movable carriage that is motor driven. A frictional spool wheel engages the tube to drive the carriage while also serving as a guide wheel. Two cam wheels are also driven by the same motor that drives the carriage. One cam wheel controls operation of the welding torches on an intermittent basis. The second cam wheel controls the drive motor so that the latter is operated at a first speed during welding and a faster speed when welding in interrupted. This allows the device to traverse a given distance in less than half the time that would be required if the slower welding speed were maintained throughout the entire length of the tube.

6 Claims, 5 Drawing Figures

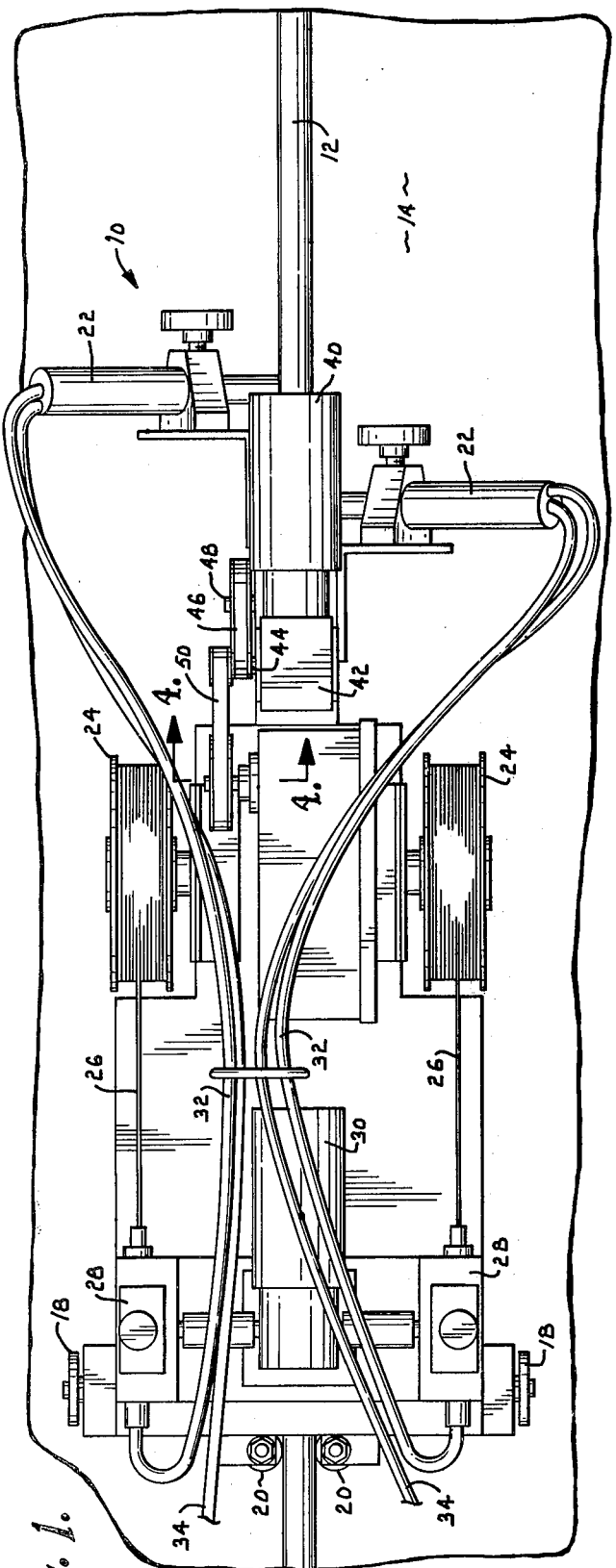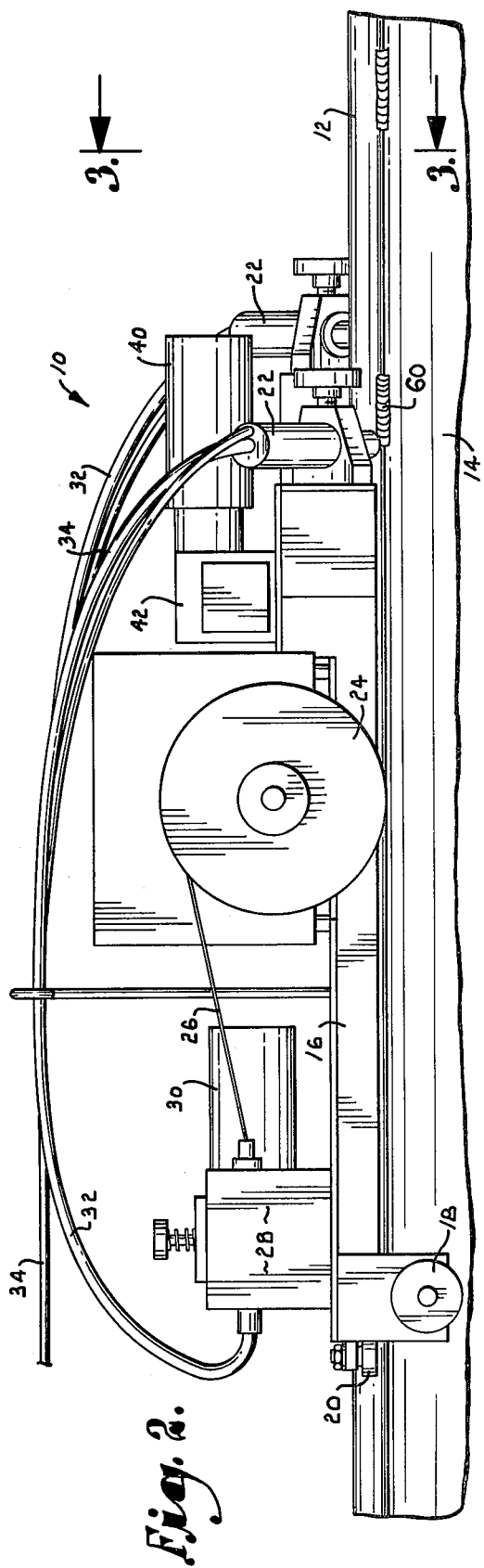

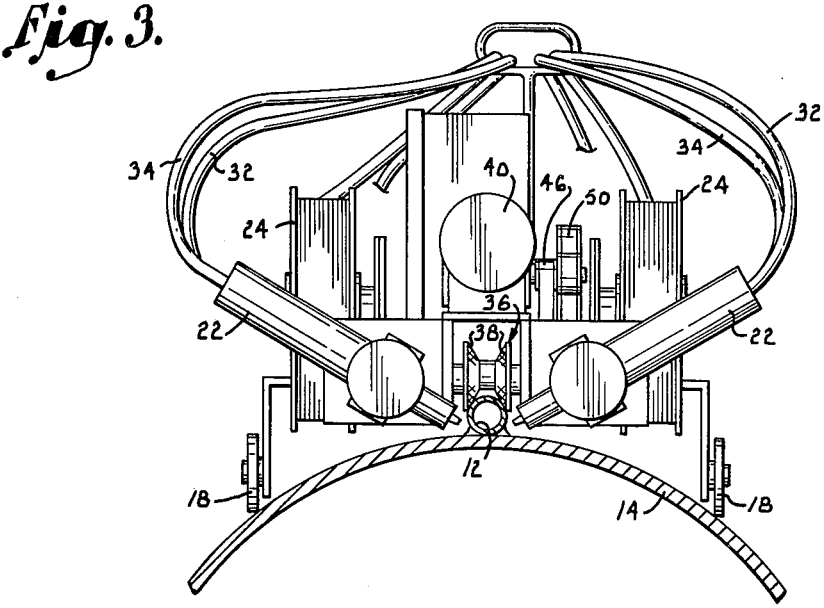
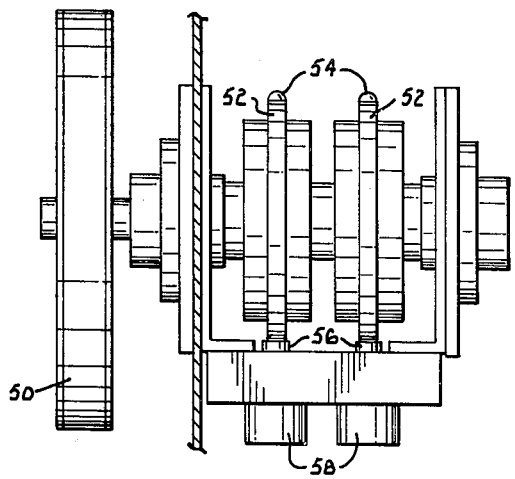
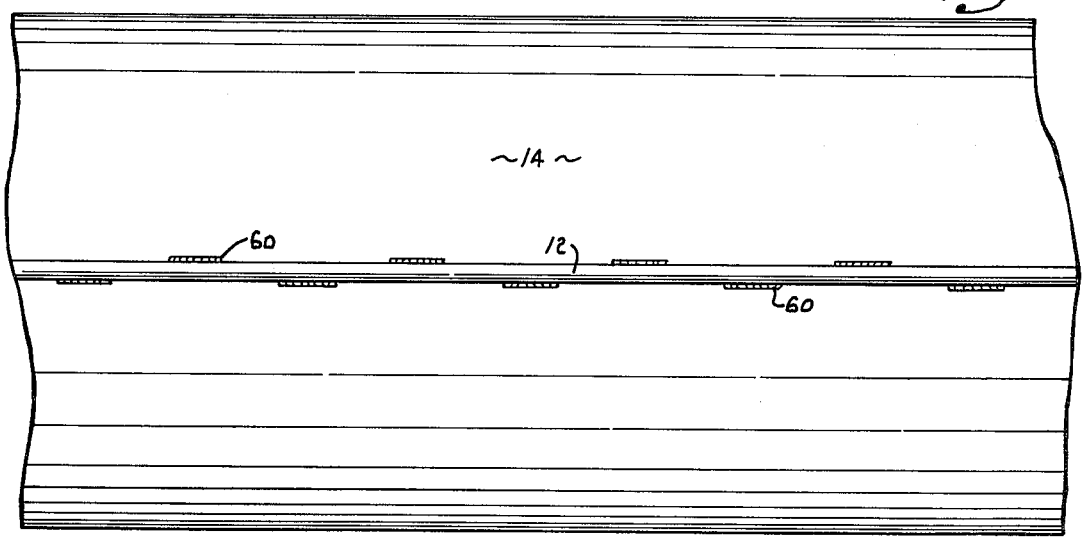

DEVICE FOR WELDING TUBES TO PIPE

This invention relates generally to welding machines and, more particularly, to an automatic welder for tack welding a tube to a pipe of larger diameter.

Automatic welding machines are well known and widely used for a variety of purposes. In some instances, automatic welders move relative to a work piece and in other instances the work piece is moved relative to the welder.

In the construction of pipelines it is sometimes desirable to provide protection from currents which may be present in the soil by providing a "skin current" on the outside of the pipeline. This technique is generally known as skin effect current tracing and is achieved by welding a small diameter tube onto the outside of the fluid-carrying pipeline. The small diameter tube in turn carries an electrical conductor. It is not necessary to weld the tube throughout the entire length of the pipeline but instead "tack welding" is employed to intermittently weld the tube sufficiently to hold it in place.

Heretofore, tack welding of small diameter tubes onto pipelines has been achieved by manually welding along the length of the tube. Manifestly, this is time consuming and labor intensive, making the process expensive.

It is, therefore, a primary object of the present invention to provide a device for automatically tack welding a tube of relatively small diameter to another object, particularly, a pipe of larger diameter.

It is also an object of the present invention to provide a device for tack welding small diameter tubes to other objects wherein the device is operable to travel at a relatively low speed during welding and at a much faster speed when not welding.

An important aim of the present invention is to provide a relatively simple electromechanical control for operating the drive motor of the device of the type described in the foregoing objects so as to control operation of the device automatically but in a relatively simple, easily adjustable manner.

Another one of the objects of the invention is to provide for the automatic tack welding of a tube of relatively small diameter to another object wherein the device is movable relative to the other object thereby avoiding the expense of equipment for moving an object such as a large diameter pipe.

Still another object of this invention is to provide a device for tack welding a relatively small diameter tube to another object whereby the tube may be simultaneously welded on opposite sides at spaced apart locations thereby minimizing the amount of time spent in the welding mode.

Other objects of the invention will be made clear or become apparent from the following description and claims when read in light of the accompanying drawings wherein:

FIG. 1 is a top plan view of the device according to the present invention;

FIG. 2 is a side elevational view of the device shown in FIG. 1;

FIG. 3 is a front elevational view of the welding device of the present invention looking in the direction of arrows 3—3 in FIG. 2;

FIG. 4 is a vertical, cross-sectional view, on an enlarged scale, taken along line 4—4 of FIG. 1; and with portions broken away to illustrate details of construction; and FIG. 5 is a schematic illustration of the welding pattern which is achieved utilizing the device of the present invention.

Referring initially to FIGS. 1 and 2, the device of the present invention is designated generally by the numeral 10 and is designed to tack weld a tube 12 of relatively small diameter to a pipe 14 of relatively large diameter. The term "tube" as used in this application is intended to refer to any type of closed conduit regardless of cross-sectional configuration. Device 10 comprises a unitary platform type carriage assembly 16 provided with outrigger rollers 18 which engage the surface of pipe 14 in a vertical plane and guide rollers 20 disposed in generally horizontal planes for engaging the sides of tube 12.

Also mounted on carriage 16 are first and second welding torches 22 disposed on opposite sides of tube 12. Welding wire feed rolls 24 supply welding wire 26 to wire feed controllers 28. Controllers 28 are driven by an electric motor 30 operably coupled therewith. A length of welding wire 26 extends from each of the controllers 28 inside of a casing 32 to each welding torch 22. Conduits 34 direct inert gas from a source (not shown) to torches 22.

Referring additionally to FIG. 3, the forward end of carriage 16 is supported by a drive wheel designated generally by the numeral 36. Drive wheel 36 is provided with opposed facing knurled surfaces 38 which are in frictional engagement with tube 12 on opposite sides of the latter. Drive wheel 36 is powered by an electric motor 40 operating through a gear box 42 having an output shaft 44. A drive belt 46 couples output shaft 44 with a shaft 48 coupled with the drive wheel through appropriate drive pulleys.

A second drive belt 50 is also coupled with shaft 44 and drives first and second camming wheels 52 shown in FIG. 4. Each camming wheel 52 has a camming lobe 54 at a point on its circumference which is engageable with an actuator button 56 positioned beneath each of the wheels 52. Each button 56 is operably coupled with a switch 58. Appropriate circuitry (not shown) is provided for coupling one switch 58 with drive motor 40 and the other switch 58 with the control circuit for actuating welding torches 22. The control circuit for torches 22, which circuit is actuated by closing one of the switches 58, is designed to operate the torches for a period of time to achieve a weld of a desired length, for example, four inches. The torches are then deactivated for the remainder of a cycle during a single revolution of one of the wheels 52.

The control circuit for motor 40 is designed to operate the motor at a first relatively slow speed while torches 22 are operating. Once welding is terminated, the motor 40 will operate at a much faster speed moving the entire device to the next welding location immediately prior to which the motor is slowed. This sequence is also accomplished during one revolution of one of the wheels 52. Each time wheels 52 complete a revolution and contact actuators 56 thereby closing switches 58, a signal is provided to the circuitry to recycle the foregoing described sequences.

In operation, the welding sequence including length of the weld and the distance between welds is selected and preprogrammed into the control circuitry. The device 10 is placed on pipe 14 straddling tube 12 in the manner illustrated in FIG. 3. Since the major portion of the weight of the device will be resting upon drive surfaces 38, good frictional engagement between these surfaces and tube 12 is assured. A suitable power source (not shown) is provided and motor 40 is actuated to commence movement of the device simultaneously with operation of torches 22. It is to be understood that the term "welding means" as used in the present application and particularly the appended claims hereto, is intended to encompass all elements necessary for functionally completing a weld including the welding wire, a power source and a source of inert gas. A weld 60 is completed by each of the welding torches 22 during the welding mode portion of the operating cycle. Preferably, the weld is about four inches in length and each of the welds is spaced apart in a longitudinal direction by approximately four inches. When a weld of this length is completed, the drive motor is automatically advanced to fast speed wherein the device 10 will travel a distance of slightly less than twelve inches before it slows down to complete the operating cycle before commencing another welding mode. The cycle is repeated throughout the length of tube 12 until the tube is tack welded onto pipe 14 in the manner illustrated in FIG. 5. By virtue of the fact that drive motor 40 is operated at a substantially greater speed between the welding modes, the device is able to traverse the pipe 14 in less than half the time that would be required if the device operated constantly at the slower speed required during welding.

We claim:

1. A device for intermittent welding of a tube onto another object, said device comprising:
   welding means;
   means for mounting said welding means for movement along said tube;
   drive means for moving said mounting means along said object;
   first control means comprising a first camming device for operating said welding means on an intermittent basis;
   second control means comprising a second camming device for operating said drive means at a first speed when said welding means is operating and at a faster speed when the welding means is not operating;
   means for mounting each of said camming devices for travel over a predetermined path;
   means for coupling each of said camming devices with said drive means;
   switch means operable by each of said camming devices; and
   circuit means coupling said welding means and said drive means with said switch means for operating said welding means and said drive means in response to selective operation of said switch means by said camming devices.

2. A device as set forth in claim 1, wherein is included a second welding means, said two welding means being disposed on opposite sides of said tube.

3. A device as set forth in claim 2, wherein each of said welding means is spaced apart in a longitudinal direction.

4. A device as set forth in claim 3, wherein said drive means comprises a drive wheel in frictional engagement with said tube.

5. Apparatus for welding a tube of relatively small cross section onto a pipe of larger cross section, said apparatus comprising:
   first and second welding means;
   means for mounting said welding means in opposed relationship on opposite sides of said tube and in longitudinally spaced apart relationship;
   guide means for said mounting means for contacting the pipe surface;
   drive means for moving said mounting means along said pipe;
   first control means for operating said welding means on an intermittent basis, said first control means comprising a camming wheel, means for mounting said wheel for rotational movement, means for coupling said wheel with said drive means, switch means operable by said camming wheel, and circuit means coupling said switch means with said welding means; and
   second control means for operating said drive means at a first speed when said welding means are operating and at a faster speed when said welding means are not operating, said second control means comprising a camming wheel, means for mounting said wheel for rotational movement, means for coupling said wheel with said drive means, switch means operable by said camming wheel, and circuit means coupling said switch means with said drive means.

6. The invention of claim 5, wherein said drive means includes a drive wheel in frictional engagement with said tube.

* * * * *